US009817855B2

(12) United States Patent
Blaas

(10) Patent No.: US 9,817,855 B2
(45) Date of Patent: Nov. 14, 2017

(54) METHOD AND SYSTEM FOR DETERMINING A MEASURE OF OVERLAP BETWEEN DATA ENTRIES

(71) Applicant: SynerScope B.V., Eindhoven (NL)

(72) Inventor: Jorik Blaas, Eindhoven (NL)

(73) Assignee: SYNERSCOPE B.V., Eindhoven (NL)

( * ) Notice: Subject to any disclaimer, the term of this patent is extended or adjusted under 35 U.S.C. 154(b) by 211 days.

(21) Appl. No.: 14/215,292

(22) Filed: Mar. 17, 2014

(65) Prior Publication Data

US 2015/0261750 A1 Sep. 17, 2015

(51) Int. Cl.
*G06F 17/30* (2006.01)
*G06Q 10/10* (2012.01)

(52) U.S. Cl.
CPC .... *G06F 17/3033* (2013.01); *G06F 17/30321* (2013.01); *G06F 17/30324* (2013.01); *G06Q 10/10* (2013.01)

(58) Field of Classification Search
CPC ............ G06F 12/0207; G06F 12/0813; G06F 12/1483; G06F 15/173; G06F 17/16; G06F 2212/454; G06F 9/5072; G06F 17/3083; G06F 17/30321; G06F 17/30324
USPC ........................................................ 707/692
See application file for complete search history.

(56) References Cited

U.S. PATENT DOCUMENTS

| 5,404,510 | A * | 4/1995 | Smith | G06F 17/30598 |
| 6,732,110 | B2 * | 5/2004 | Rjaibi | G06F 17/30469 |
| 7,761,425 | B1 * | 7/2010 | Erickson | G06F 11/1453 |
| | | | | 707/649 |
| 8,527,498 | B1 * | 9/2013 | Lopes | G06F 17/30504 |
| | | | | 707/713 |
| 8,775,471 | B1 * | 7/2014 | Kozyrczak | G06F 17/30861 |
| | | | | 707/748 |
| 9,087,295 | B1 * | 7/2015 | Dillon | G06F 17/18 |
| 2007/0112724 | A1 * | 5/2007 | Beach | G06F 17/30286 |
| 2007/0239663 | A1 * | 10/2007 | Dyskant | G06F 17/30445 |
| 2008/0154992 | A1 * | 6/2008 | Lassalle | G06F 17/30613 |
| | | | | 707/999.205 |

(Continued)

OTHER PUBLICATIONS

Everett, Martin G., Stephen P. Borgatti, "Analyzing Clique Overlap", 1998, Connections 21, pp. 49-61.*

(Continued)

*Primary Examiner* — Pierre Vital
*Assistant Examiner* — Alicia Antoine
(74) *Attorney, Agent, or Firm* — Kenealy Vaidya LLP

(57) ABSTRACT

A data analysis system and method for determining a measure of overlap between data entries in a number N of columns in a database. Sorted hash lists are provided. An N×N matrix having cells $C_{ij}$ is provided. A set of N indexed read pointers pointing to the hash lists are provided. Each read pointer points to the first entry of the associated hash list. The value of cells $C_{ij}$ in the matrix having indices i,j, wherein i and j each correspond to any of the index numbers of the read pointers pointing to the lowest value are incremented. The read pointer(s) pointing to the lowest value are incremented to point to the next different hash value(s). This is repeated until the last read pointer(s) points to the last entry of the associated hash list.

18 Claims, 8 Drawing Sheets

(56) References Cited

U.S. PATENT DOCUMENTS

2011/0021373 A1* 1/2011 Walker ............. G01N 33/54306
                                                            506/9
2012/0117080 A1* 5/2012 Lamanna .......... G06F 17/30613
                                                          707/747
2014/0095511 A1* 4/2014 Patterson .......... G06F 17/30616
                                                          707/741
2014/0304275 A1* 10/2014 Baskett ............. G06F 17/30315
                                                          707/747

OTHER PUBLICATIONS

Gregori, Enrico, "Parellel k-Clique Community Detection on Large-Scale Networks", 2013, IEEE, IEEE Transactions on Parallel and Distributed Systems, vol. 24, No. 8, pp. 1651-1660.*

* cited by examiner

Fig. 4a

| 1 | 2 | 3 | 4 |
|---|---|---|---|
| New York | New York | Paris | New York |
| Paris | Rome | Madrid | Amsterdam |
| Paris | Brussels | Madrid | Dublin |
| Amsterdam | Berlin | Madrid | London |
| London | Paris | Rome | New York |
| Berlin |  | Berlin | London |
| Madrid |  | Paris | Amsterdam |
| Brussels |  | Berlin | Dublin |
| Rome |  |  | New York |
| New York |  |  | London |
|  |  |  | Amsterdam |
|  |  |  | Amsterdam |
|  |  |  | Dublin |

Fig. 4b

| 1 | 2 | 3 | 4 |
|---|---|---|---|
| A | A | C | A |
| C | H | G | D |
| C | F | G | I |
| D | E | G | B |
| B | C | H | A |
| E |  | E | B |
| G |  | C | D |
| F |  | E | I |
| H |  |  | A |
| A |  |  | B |
|  |  |  | D |
|  |  |  | D |
|  |  |  | I |

Fig. 4c

| 1 | 2 | 3 | 4 |
|---|---|---|---|
| A | A | C | A |
| B | C | E | B |
| C | E | G | D |
| D | F | H | I |
| E | H |  |  |
| F |  |  |  |
| G |  |  |  |
| H |  |  |  |

METHOD AND SYSTEM FOR DETERMINING A MEASURE OF OVERLAP BETWEEN DATA ENTRIES

FIELD OF THE INVENTION

The present invention concerns a data analysis system.

More specifically, embodiments of the present invention concern methods and apparatus for processing data to determine a measure of overlap between data entries in a number of columns in one or more databases.

BACKGROUND TO THE INVENTION

These days much data is generated and stored in digital form. Since the 1980s the world's capacity to digitally store information has increased by over twenty percent per year. In 2012 every day 2.5 exabytes ($2.5 \times 10^{18}$) of data were created every day. Some parts of this data is publicly available, other parts are in-company data.

The term 'big data' is often used in this connection for a collection of data so large and complex that it becomes difficult to process using on-hand database management tools or traditional data processing applications.

This data is often heterogeneous with many interconnections and dependencies (relations) or and/or correlations. Large collections of data relations contain valuable information, but these relations need to be ordered and structured before the actual patterns present in the data can be easily disclosed. It is desirable to leverage the valuable and often unknown information contained in this data. For example this allows data analysis where none currently takes place. Nevertheless, this requires assessing millions of data points within an acceptable period of time.

Much of this data is stored in large databases, sometimes referred to as data warehouses. Such databases can store thousands of columns of data entries. The total number of data entries in such database can be millions or even billions.

The database can for instance store in-company data, such as client data. Such client data can be distributed over columns storing all kinds of information. Some groups of columns can relate to personal data such as first names, last names, social security numbers, phone numbers, email addresses, IP-addresses, street addresses, postal codes, city names, state names, country names, etc. Other groups of columns can relate to financial information such as bank account numbers, credit card numbers, etc. Yet other groups of columns can relate to products offered by a company, such as financial products such as mortgage types, savings account types, loan types, credit types, clients making use of such products, etc. Yet other groups of columns can relate to insurance products such as car insurance types, health insurance types, life insurance types, home insurance types, liability insurance types, clients making use of such products, etc. Also, the database can contain additional columns. For instance in relation to car insurance types the database can also include columns relating to car makes, car types, gasoline consumption, $CO_2$ emissions, car weight, etc.

The vastness of the amount of data stored in the database can make assessing interrelations between separate columns of data virtually impossible or at least very complex and time consuming. This may cause that a first department within a company, e.g. a financial department, is unaware of data stored by a second department, e.g. an insurance department. From a business perspective it would be highly desirable that separate departments can benefit from data stored by other departments.

From a marketing perspective it can also be desirable to be able to combine and/or compare databases of different companies, e.g. of a bank or insurance company and a telecom provider.

In view of the above a data analysis system is desirable which assists in assessing relations between columns of data in a database.

SUMMARY OF THE INVENTION

In accordance with a first aspect of the present invention there is provided a computer implemented method of determining a measure of overlap between data entries in a number of columns in one or more databases. The method includes the following steps:

a) For each one of N columns a hash list is created comprising for each data entry in the column a hash value representative of said data entry, the values in the hash list being sorted according to the hash values in the list.

b) A matrix is created having N columns and N rows (N×N matrix). The matrix has cells identified by $C_{ij}$, wherein i represents the column number and j represents the row number of the cell in the matrix.

c) A set of N indexed read pointers is assigned. Each read pointer points to a single associated sorted hash list.

d) Each read pointer is set to the first entry of the associated hash list.

e) The index number(s) of the read pointer(s) pointing to the lowest hash value when processing the lists in ascending order, or the index number(s) of the read pointer(s) pointing to the highest hash value when processing the lists in descending order are determined.

f) The value of cells $C_{ij}$ in the matrix having indices i,j, wherein i and j each correspond to any of the index numbers determined in step e) are incremented.

g) The read pointer(s) having the index number(s) determined in step e) are incremented to point to the next different hash value(s) and steps e) and f) are repeated.

h) Step g) is repeated until the last read pointer(s) points to the last entry of the associated hash list.

Thus, a matrix is generated which provides a measure of overlap between individual columns in the one or more databases. It will be appreciated that the cell values on the diagonal, i.e. $C_{ij}$ with i equal to j, give a measure of the number of unique entries in the column i of the databases. It will be appreciated that the cell values off-diagonal, i.e. $C_{ij}$ with i unequal to j, give a measure of the number of unique values that are shared between columns i and j of the databases.

Providing the matrix provides the advantage that a measure of overlap between different columns in the database(s) is expressed as a single value, without having to assess the actual individual data entries in the columns. Therefore, columns sharing data entries can be identified and ranked in an easy manner. Moreover, providing the matrix provides the advantage that a measure of overlap between different columns in the database(s) can be determined on simple numerical basis from the cell values $C_{ij}$, without having to take into account values and/or types of the underlying raw data.

Moreover, the matrix is generated in a highly efficient manner by processing and comparing all columns in parallel. This greatly reduces the time in which the matrix is generated, which is of importance when assessing large databases, for example a database containing on the order of 20,000,000,000 separate data entries in 20,000 columns.

Once the matrix has been generated, it is possible to evaluate the contents of columns of the database(s) by looking at the cell values of the matrix. Therefore, overlap of data in columns and other similarities or correlations can easily be obtained by looking at a number of cell values that is far less than the millions or billions (or more) of data entries. Hence, the evaluation can be performed much faster and with much less load on the system.

Also, the matrix allows evaluating overlap of data in columns and other similarities or correlations without actual access to the underlying data entries. Therefore, it is also possible to outsource evaluation to third parties while maintaining the underlying data entries secure or secret.

Optionally, the matrix contains integer values. Optionally, the matrix is empty at the start of the process, i.e. each cell then contains the value zero. In step f) the values of those cells are optionally increased by one. Hence, the cell values on the diagonal, i.e. $C_{ij}$ with i equal to j, give the number of unique entries in the column i of the databases, and the cell values off-diagonal, i.e. $C_{ij}$ with i unequal to j, give the number of unique values that are shared between columns i and j of the databases. It will be appreciated that when processing all lists in ascending order the first entry is the lowest hash value, and when processing all lists in descending order the first entry is the highest hash value.

Providing for each one of N columns a hash list comprising for each data entry in the column a hash value representative of said data entry provides the advantage that columns of dissimilar content or format can still easily be compared. The hash value may be obtained by any known hash function. Examples are SHA (Secure Hash Algorithm) functions, MD5 (Message Digest Algorithm 5) functions, removing of spaces, conversion to lowercase, etc.

The step a) may include for each hash list discarding identical values, which simplifies the step of incrementing the read pointers to point to the next different hash value(s).

The step f) may include incrementing the value of the cells $C_{ij}$ in the matrix having indices i,j, wherein i,j corresponds to each unique combination of the index numbers determined in step e), including the cases i=j. In this way, only half of the matrix (relative to the diagonal) is updated, which makes use of the notion that the matrix of values is symmetrical with respect to the diagonal. This can save valuable computing time when processing large amounts of data.

The step f) may include incrementing the value of all cells $C_{ij}$ in the matrix having indices i,j, wherein i and j each corresponding to any of the index numbers determined in step e). In this way all of the cells of the matrix are updated.

All hash values within a hash list may have the same length. All hash values in all hash lists may have the same length. This renders comparing of the hash values in different columns simpler and more efficient.

The method may including the step of determining a desired level of accuracy and creating the hash values having a length that has been determined on the basis of the desired level of accuracy. Creating for each data entry in the columns a hash value representative of said data entry may involve loss of accuracy, especially when the hash values are shorter than the data entries. Normally, the longer the hash values are, the more accurate the hash value represents the original data entry in the column in the database. It is also possible to deliberately set the desired level of accuracy relatively low, so as to allow similar, but non-identical, data entries to be represented by identical hash values so as to determine a measure of overlap of similar data entries between different columns. Herein similar indicates that the data entries have a partial overlap but are not fully identical. This can e.g. be used to account for spelling errors and/or typographical errors.

The method may further include after step h) determining the cell $C_{ij}$, with i unequal to j, having the highest value. This cell $C_{ij}$ having the highest value signifies the combination of columns i and j having the largest number of data entries in common. The method may further include after step h) determining the cells $C_{ij}$ having a value that is higher than a threshold value. This yields the columns having more data entries in common than specified by the threshold value.

The method may further include after step h) normalizing the values in the cells of the matrix by dividing the value of each cell $C_{ij}$ by the value of $C_{ii}$. The cells $C_{ij}$ with i>j signify the percentage of overlap of values in column i found in column j, the cells $C_{ij}$ with i<j signify the percentage of overlap of values in column j found in column i. It will be appreciated that the matrix containing the normalized values in the cells is not necessarily symmetrical relative to the diagonal. The method may further include determining the cells $C_{ij}$ having a normalized value that is higher than a threshold value.

The method may further include after step h) processing the values of the cells in row p and/or column p by dividing the value of cells $C_{xy}$ by the value of cells $C_{yx}$. The value of the thus processed value of $C_{ij}$ signifies the ratio of the amount of values present in column i relative to the amount of values present in column j. The cell $C_{ij}$ or $C_{ji}$ having the largest normalized value and the processed value closest to one indicates the column j being the closest subset or superset of column i.

The present method is especially well suited for handling big data. The number N of columns may be more than 1,000, more than 10,000, and even more than 100,000.

The method my further include the step of including in the number N of columns at least one column containing data entries of a known type. As will be discussed below, this allows to determine a type of data entries in a column of unknown data type.

The step g) may include when the read pointer was not already pointing to the last entry in the hash list: incrementing the read pointer(s) pointing to the hash value determined in step e) to point to the next entry in the respective hash list, and when the read pointer was already pointing to the last entry in the hash list: not incrementing the read pointer(s) pointing to the hash value determined in step e), or incrementing the read pointer(s) pointing to the hash value determined in step e) to point to outside the respective hash list, and ignoring the index number of that read pointer(s) for subsequent steps f) and g).

The method may further include after step h):
i) receiving a further number M of columns and creating M further sorted hash lists comprising for each data entry in the further column a hash value representative of said data entry;
j) adding $N+1^{th}$ to $N+M^{th}$ columns and $N+1^{th}$ to $N+M^{th}$ rows to the matrix;
k) assigning a set of N+M indexed read pointers, each read pointer pointing to a single associated sorted hash list, the $N+1^{th}$ to $N+M^{th}$ read pointers pointing to the further hash lists;
l) setting each read pointer to the first entry of the associated hash list;
m) determining the index number(s) of the read pointer(s) pointing to the lowest hash value when processing the lists in ascending order, or determining the index number(s) of the read pointer(s) pointing to the highest hash value when processing the lists in descending order;

n) incrementing the value of cells $C_{ij}$ in the matrix having indices i,j, wherein i and j each correspond to any of the index numbers determined in step m) and wherein at least one of i and j is in the range of N+1 to N+M;

o) incrementing the read pointer(s) having the index number(s) determined in step m); and p) repeating step o) until the last read pointer(s) points to the last entry of the associated hash list. Hence, one or more (M) columns can be added to previously assessed N columns, without determining the entire matrix anew. This can save valuable computing time when processing large amounts of data. Moreover, this allows gradual buildup of the matrix for very large data sets. This also allows periodical update of the matrix for expanding data sets.

A type of data entries in at least one of the columns may be one of first name, last name, social security number, phone number, email address, IP-address, street address, postal code, city, country, bank account number, credit card number.

Although, as described above, providing for each data entry in the columns a hash value representative of said data entry may be advantageous, this is not always essential. Thus, more in general according to a second aspect of the invention there is provided a method of determining a measure of overlap between data entries in a number N of columns in one or more databases, including:

a) retrieving for each column a list comprising for each data entry in the column a value representative of said data entry, the values in the list being sorted;

b) creating an N×N matrix, having cells $C_{ij}$, wherein i represents the column number and j represents the row number of the cell in the matrix;

c) assigning a set of N indexed read pointers, each read pointer pointing to a single associated sorted list;

d) setting each read pointer to the first entry of the associated list;

e) determining the index number(s) of the read pointer(s) pointing to the lowest value when processing the lists in ascending order, or determining the index number(s) of the read pointer(s) pointing to the highest value when processing the lists in descending order;

f) incrementing the value of cells $C_{ij}$ in the matrix having indices i,j, wherein i and j each correspond to any of the index numbers determined in step e);

g) incrementing the read pointer(s) having the index number(s) determined in step (e) to point to the next different value(s) and repeating steps e) and f); and h) repeating step g) until the last read pointer(s) points to the last entry of the associated list.

As set out above, herein the step a) of retrieving the lists may include creating for each column a hash list comprising for each data entry in the column a hash value representative of said data entry.

According to a third aspect of the invention there is provided a method of determining a type of data entries in a to-be-assessed column in a database. According to this aspect, again a number of sorted lists is provided. This may be sorted hash lists. One of the lists corresponds to the to-be assessed column. One or more other lists correspond to sorted (hash) lists containing (hash) values representative of data entries of known types thus forming a number N of sorted (hash) lists. For these lists the N×N matrix is generated according to the steps a) through h) as described above with respect to the first and second aspects of the present invention. From this matrix it is determining which cell $C_{pq}$ and/or $C_{qp}$ indicates closest conformity between columns p and q, wherein the index p corresponds to the to-be-assessed column and index q corresponds to a list associated with data entries of known types. The type of the data entries in the to-be-assessed column is determined to be similar, or identical, to the known type of the data entries in the list corresponding to the index q.

Determining which cell $C_{pq}$ and/or $C_{qp}$ indicates closest conformity includes determining which cell $C_{pq}$ and/or $C_{qp}$ has the highest value. The highest value indicates the list q having the largest number of data entries in common with column p.

The method may further include after step h) normalizing the values in the cells in column p of the matrix by dividing the value of each cell $C_{pj}$ by the value of $C_{pp}$, wherein determining which cell $C_{pq}$ indicates closest conformity includes determining which cell $C_{pq}$ has the highest normalized value. The highest normalized value indicates the list q having the largest percentage of data entries in common with column p.

The method may further include after step h) normalizing the values in the cells in row p of the matrix by dividing the value of each cell $C_{ip}$ by the value of $C_{pp}$, wherein determining which cell $C_{qp}$ indicates closest conformity includes determining which cell $C_{qp}$ has the highest normalized value. The highest normalized value indicates the list q having the largest percentage of data entries in common with column p.

The method may further include after step h) processing the values of the cells in row p and/or column p by dividing the value of cells $C_{xy}$ by the value of cells $C_{yx}$. The value of the thus processed value of $C_{ij}$ signifies the ratio of the amount of values present in column i relative to the amount of values present in column j. The cell $C_{pq}$ or $C_{qp}$ having the largest normalized value and the processed value closest to one indicates the column q being the closest subset or superset of column p.

According to a fourth aspect of the invention there is provided a data analysis system for determining a measure of overlap between columns of data entries, including:

at least one database storing a number N of columns of data entries;

a first memory;

a second memory; and a processing module arranged for a) retrieving for each column a list comprising for each data entry in the column a value representative of said data entry, the values in the list being sorted and storing the lists in the first memory;

b) creating an N×N matrix, having cells $C_{ij}$, wherein i represents the column number and j represents the row number of the cell in the matrix, and storing the matrix in the second memory;

c) assigning a set of N indexed read pointers, each read pointer pointing to a single associated sorted list;

d) setting each read pointer to the first entry of the associated list;

e) determining the index number(s) of the read pointer(s) pointing to the lowest value when processing the lists in ascending order, or determining the index number(s) of the read pointer(s) pointing to the highest value when processing the lists in descending order;

f) incrementing the value of cells $C_{ij}$ in the matrix in the second memory having indices i,j, wherein i and j each correspond to any of the index numbers determined in step e);

g) incrementing the read pointer(s) having the index number(s) determined in step (e) to point to the next different value(s) and repeating steps e) and f); and h) repeating step h) until the last read pointer(s) points to the last entry of the associated list.

All optional measures described above in relation to the first, second and third aspect of the invention apply equally well to this fourth aspect of the invention. For instance, the processing module may further be arranged for creating for each column a hash list comprising for each data entry in the column a hash value representative of said data entry; and sorting the hash lists. The invention also relates to a data analysis system having a processing module arranged for performing the steps of the methods of the first, second and third aspect of the invention.

According to a fifth aspect of the invention there is provided a non-transient computer readable medium storing computer implementable instructions which when implemented by a programmable computer cause the computer to determine a measure of overlap between data entries in a number N of columns in one or more databases, by performing the steps of:

a) retrieving for each column a list comprising for each data entry in the column a value representative of said data entry, the values in the list being sorted;

b) creating an N×N matrix, having cells $C_{ij}$, wherein i represents the column number and j represents the row number of the cell in the matrix;

c) assigning a set of N indexed read pointers, each read pointer pointing to a single associated sorted list;

d) setting each read pointer to the first entry of the associated list;

e) determining the index number(s) of the read pointer(s) pointing to the lowest value when processing the lists in ascending order, or determining the index number(s) of the read pointer(s) pointing to the highest value when processing the lists in descending order;

f) incrementing the value of cells $C_{ij}$ in the matrix having indices i,j, wherein i and j each correspond to any of the index numbers determined in step e);

g) incrementing the read pointer(s) having the index number(s) determined in step (e) to point to the next different value(s) and repeating steps e) and f); and h) repeating step g) until the last read pointer(s) points to the last entry of the associated list.

In a further aspect there is also provided a non-transient computer readable medium storing computer implementable instructions which when interpreted by a programmable computer cause the computer to become configured as a data analysis system according to the fourth aspect.

All optional measures described above in relation to the first, second, third and fourth aspect of the invention apply equally well to each of the first through fifth aspects of the invention. The invention also relates to computer program product comprising code portions arranged for, when executed on a programmable computer, performing the steps of the methods of the first, second and third aspect of the invention.

BRIEF DESCRIPTION OF THE DRAWINGS

Embodiments of the present invention will now be described in detail with reference to the accompanying drawings in which:

FIGS. 4a-4c are a schematic representation of steps in a method of generating hash lists in accordance with an embodiment of the invention; and FIGS. 5a-5l are a schematic representation of steps in a method of generating a matrix in accordance with an embodiment of the invention.

DETAILED DESCRIPTION

Figure 1:
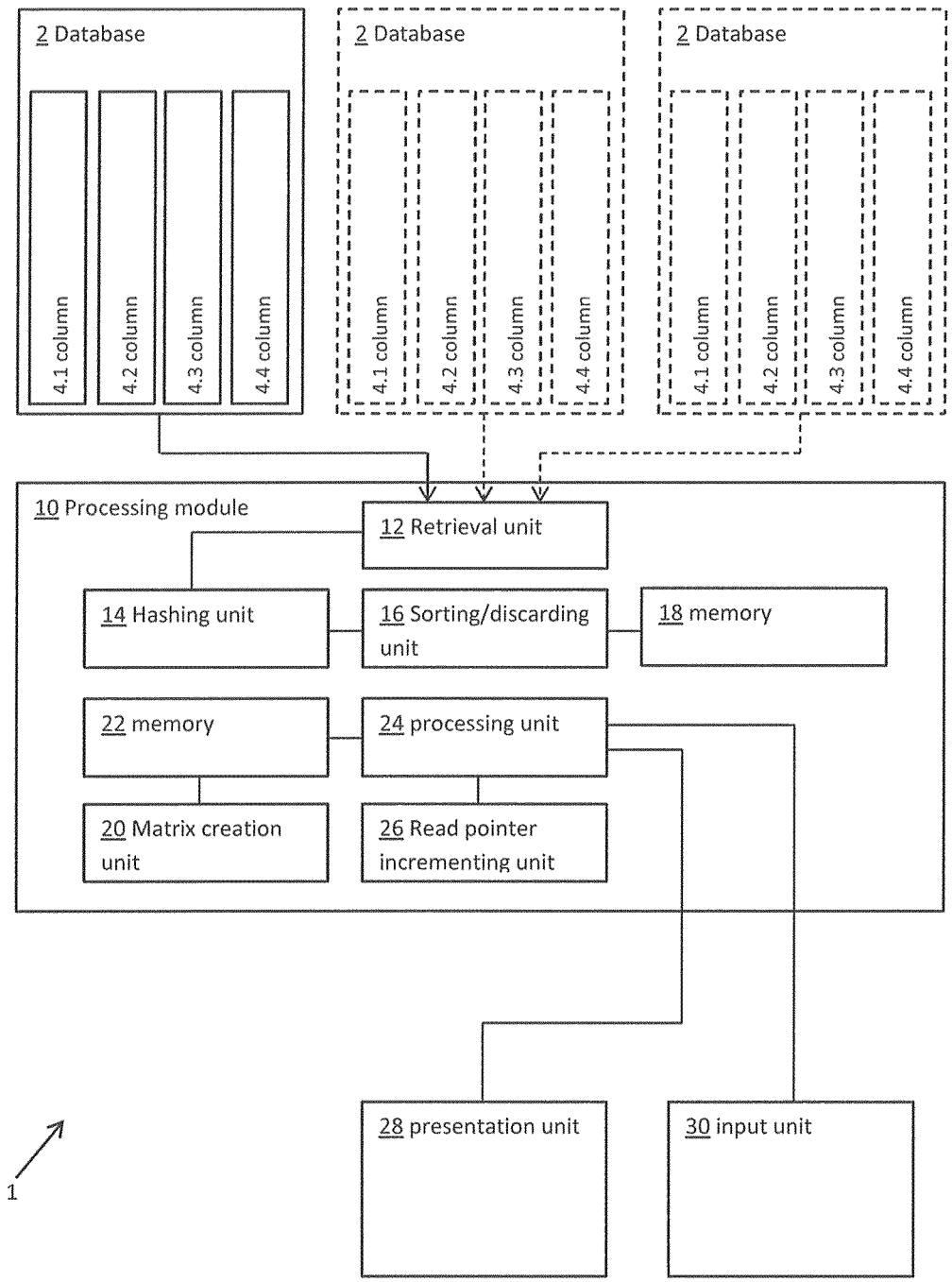
FIG. 1 is a schematic block diagram of a data analysis system in accordance with an embodiment of the present invention.

FIG. 1 is a schematic block diagram of a data analysis system 1 in accordance with an embodiment of the present invention. The data analysis system 1 comprises, or is associated with, a database 2. The data analysis system 1 may also comprise, or be associated with, a plurality of databases 2. The database(s) 2 includes a plurality of columns 4.n (n=1, 2, 3, 4, . . . ) of data entries. A number of columns of the database or databases will be processed by the data analysis system 1. This number of columns is denoted by N. The data analysis system 1 includes a processing module 10. As will be described, the processing module 10 is arranged for determining a measure of overlap between the columns 4.n in the database(s) 2 in a highly efficient manner. To that end, the processing module includes a retrieval unit 12 arranged for retrieving, or receiving, columns 4.n of data entries from the database 2. In this example, the processing module 10 further includes a hashing unit 14 arranged for creating for each column 4.n a hash list comprising for each data entry in the column a hash value representative of said data entry. In this example, the processing module 10 further includes a sorting unit 16 arranged for sorting the data in the lists. In this example the sorting unit 16 is further arranged for discarding identical values from the lists. The processing module 10 further includes a first memory 18 for storing the lists.

The processing module 10 further includes a matrix creation unit 20 arranged for creating a matrix. The number of columns in the matrix corresponds to the number N of columns to be processed. The number of rows in the matrix corresponds to the number N of columns to be processed. Thus, the matrix is an N×N matrix, having cells $C_{ij}$, wherein i represents the column number and j represents the row number of the cell in the matrix. The processing module 10 further includes a second memory 22 for storing the matrix.

The processing module 10 further includes a processing unit 24. The processing unit 24 is arranged for assigning a set of N indexed read pointers. Each read pointer is assigned to point to a single associated sorted list in the first memory 18. The processing unit 24 is further arranged for setting each read pointer to the first entry of the associated list. In this example, the sorted hash lists are being processed in ascending order, therefore for each list the first value is the lowest value of that list. In this example, the processing unit 24 is further arranged for determining the index number(s) of the read pointer(s) pointing to the lowest value in the first memory 18. The processing unit 24 is arranged for incrementing the value of cells $C_{ij}$ in the matrix in the second memory 22 having indices i,j, wherein i and j each correspond to any of the index numbers of the pointer(s) pointing to the lowest value. The processing module 10 further includes a read pointer incrementing unit 26 arranged for incrementing the read pointer(s) pointing to the lowest value to point to the next, higher, value(s).

In this example, the data analysis system 1 further includes a presentation unit 28, such as a screen or monitor. The presentation unit 28 may be used to display results of the processing by the processing module 10 to a user of the system 1. In this example, the data analysis system 1 further includes an input unit 30, such as a keyboard, mouse, touchscreen or the like, for inputting commands to the processing module 10.

Figure 2:
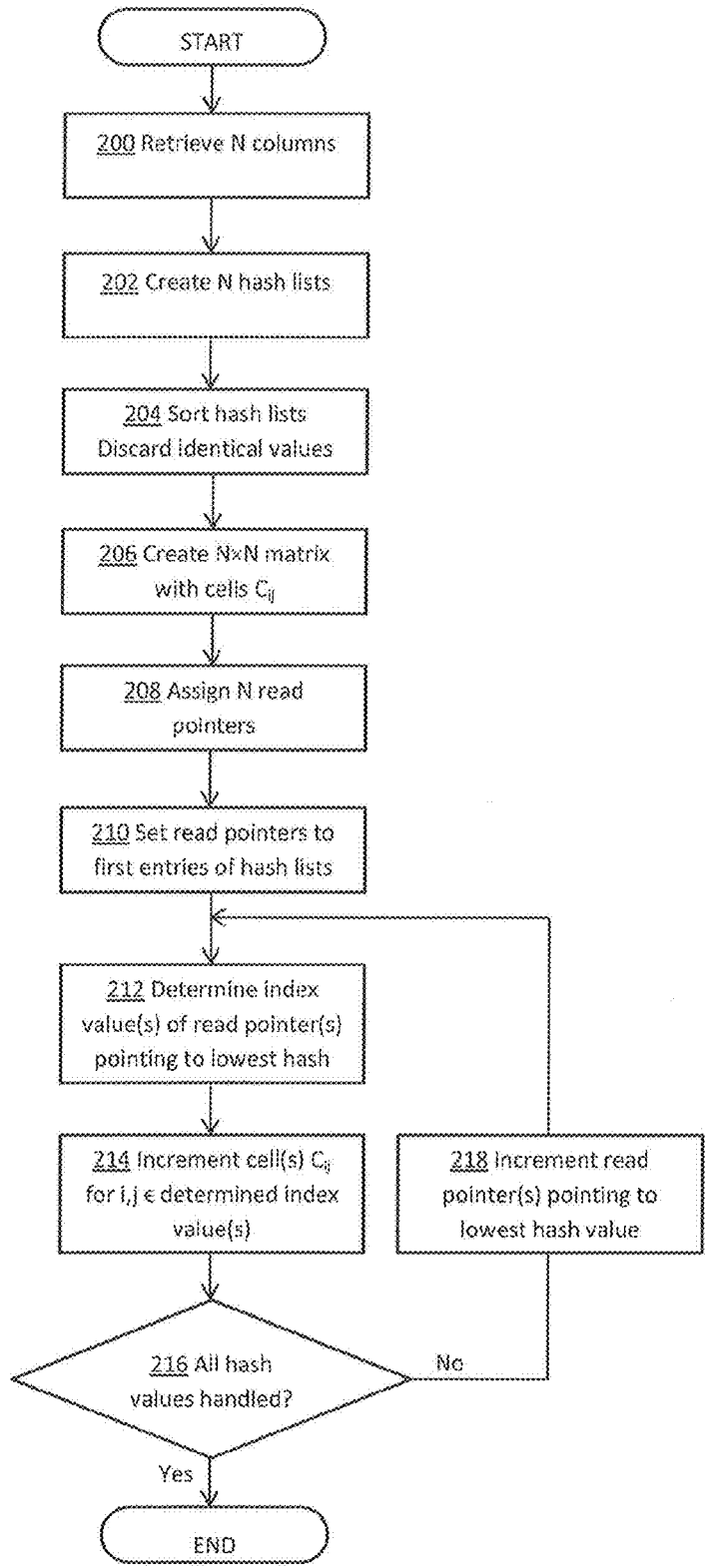
FIG. 2 is a schematic flow chart of a method in accordance with an embodiment of the invention.

The data analysis system 1 as described thus far can be used according to the following method. Reference is made to FIG. 2 which is a schematic flow chart of a method in accordance with an embodiment of the invention. In step 200 the retrieval unit 12 retrieves, or receives, the N columns from the one or more databases 2. FIG. 4*a* shows an example of four columns of data retrieved from a database 2. In step 202 the hashing unit 14 creates for each column a hash list comprising for each data entry in the column a hash value representative of said data entry. FIG. 4*b* shows an example of data in the columns of FIG. 4*a* having been hashed to hash values. In step 204 the sorting unit 16 sorts the values in the hash list according to the hash values in the list. In this example, the sorting unit 16 in step 204 for each list also discards identical values, so that each value is included in the list only once. FIG. 4*c* shows an example of the lists of hash values of FIG. 4*b* having been sorted and duplicate hash values having been removed.

It will be appreciated that in this example the processing module 10 retrieves, or receives, columns of data entries from the database(s) and processes these columns into sorted hash lists. It will be appreciated that it is also possible that the processing module 10 retrieves, or receives, pre-processed sorted hash lists. In that case the steps 202 and 204 are omitted.

Figures 5A, 5B, 5C:
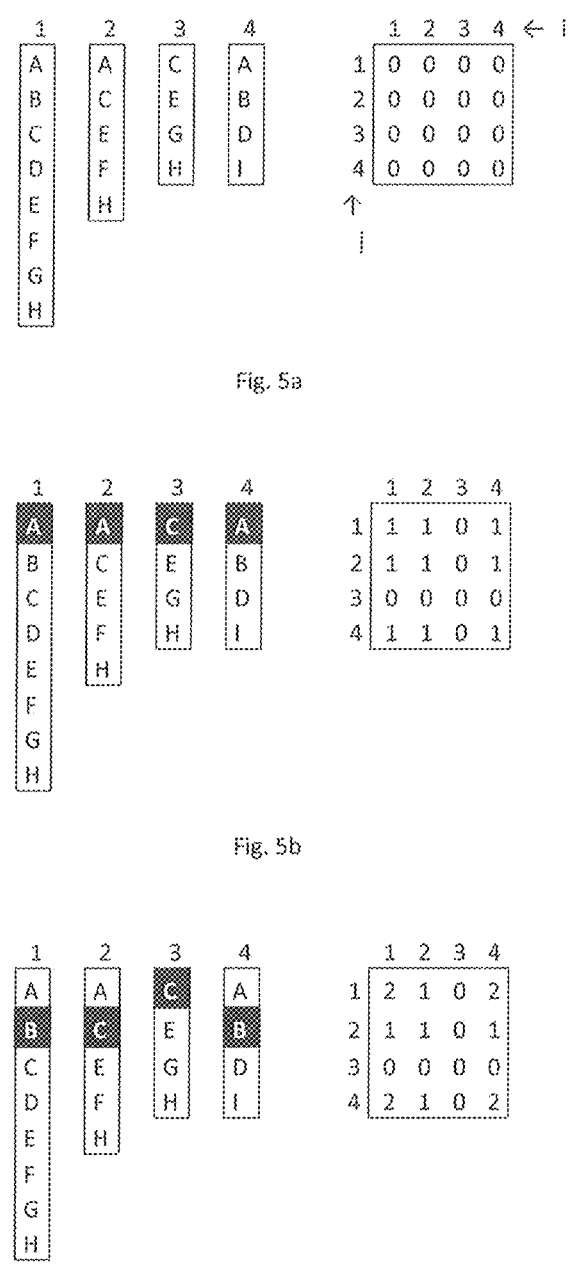
Figures 5D, 5E, 5F:
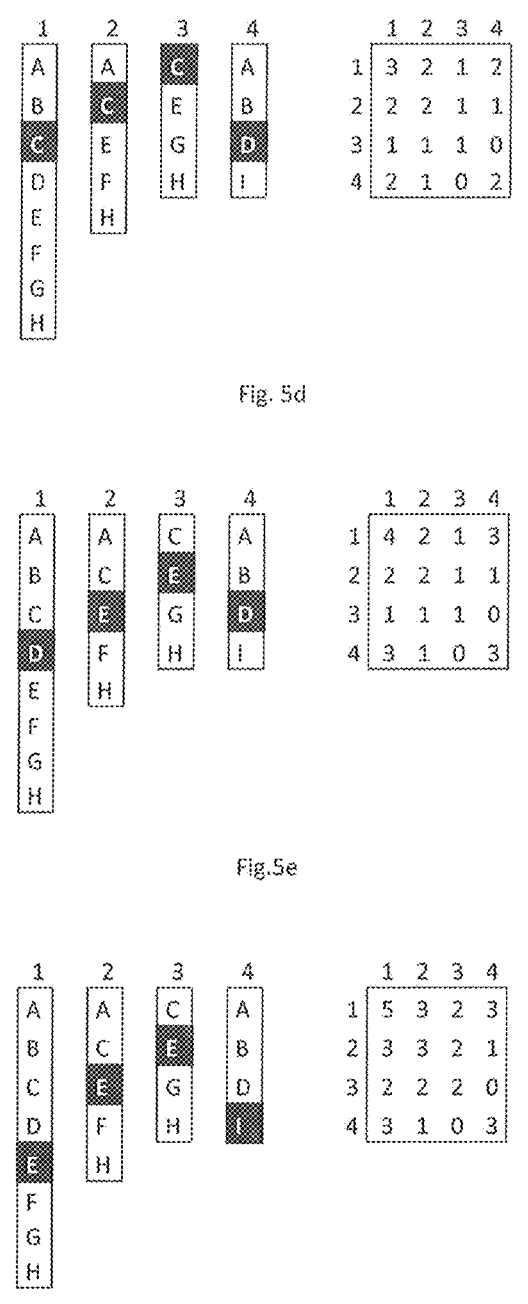

In step 206 the matrix creation unit 20 creates the N×N matrix and stores the matrix in the second memory 22. FIG. 5 shows on the left hand side the four sorted hash lists of FIG. 4*c* and on the right hand side the created 4×4 matrix. The matrix has cells $C_{ij}$, wherein i represents the column number and j represents the row number of the cell in the matrix. The column and row numbers are indicated in FIG. 5*a*. The matrix is empty, that is all values are set to zero, in the example of FIG. 5*a*.

In step 208 the processing unit 24 assigns N read pointer. Each read pointer points to a single associated hash list in the first memory 18. In step 210 each read pointer is set to point to the first entry of the associated hash list. In FIG. 5*b* the entry in the hash list to which the respective read pointer points is indicated by a black background. It will be appreciated that in FIG. 5*b* all read pointers point to the first entries of all respective hash lists.

In step 212 the processing unit 24 determines the index number(s) of the read pointer(s) pointing to the lowest hash value. In the example of FIG. 5*b* the read pointers pointing to the lists numbered 1, 2 and 4 point to the value "A", whereas the read pointer pointing the list numbered 3 points to the value "C". Therefore, the processing unit 24 determines that read pointers with index numbers 1, 2 and 4 point to the lowest hash value. Next, in step 214 the processing unit 24 increments the value of cells $C_{ij}$ in the matrix, wherein i and j each correspond to any of the determined index numbers 1, 2 and 4. In FIG. 5*b* the processing unit 24 thus increments the cells $C_{11}$, $C_{12}$, $C_{14}$, $C_{21}$, $C_{22}$, $C_{24}$, $C_{41}$, $C_{42}$, and $C_{44}$. In this example, the cell values are incremented by one.

In step 216 the processing unit 24 determines whether or not all hash values in all lists have been processed yet. Since in the state shown in FIG. 5*b* not all hash values have been processed yet, in step 218 the read pointer incrementing unit 26 increments the read pointers having the just determined index numbers to point to the next different hash value(s). This is shown in FIG. 5*c*. The read pointers 1, 2 and 4 that pointed to the value "A" in FIG. 5*b* are incremented to point to the next entry in the respective hash lists.

Then the process is repeated. In step 212 the processing unit 24 determines the index number(s) of the read pointer(s) pointing to the lowest hash value. In the example of FIG. 5*c* the read pointers pointing to the lists numbered 1 and 4 point to the value "B", whereas the read pointer pointing the lists numbered 2 and 3 points to the value "C". Therefore, the processing unit 24 determines that read pointers with index numbers 1 and 4 point to the lowest hash value. Next, in step 214 the processing unit 24 increments the value of cells $C_{ij}$ in the matrix, wherein i and j each correspond to any of the determined index numbers 1 and 4. In FIG. 5*c* the processing unit 24 thus increments the cells $C_{11}$, $C_{14}$, $C_{41}$, and $C_{44}$.

Figures 5G, 5H, 5I:
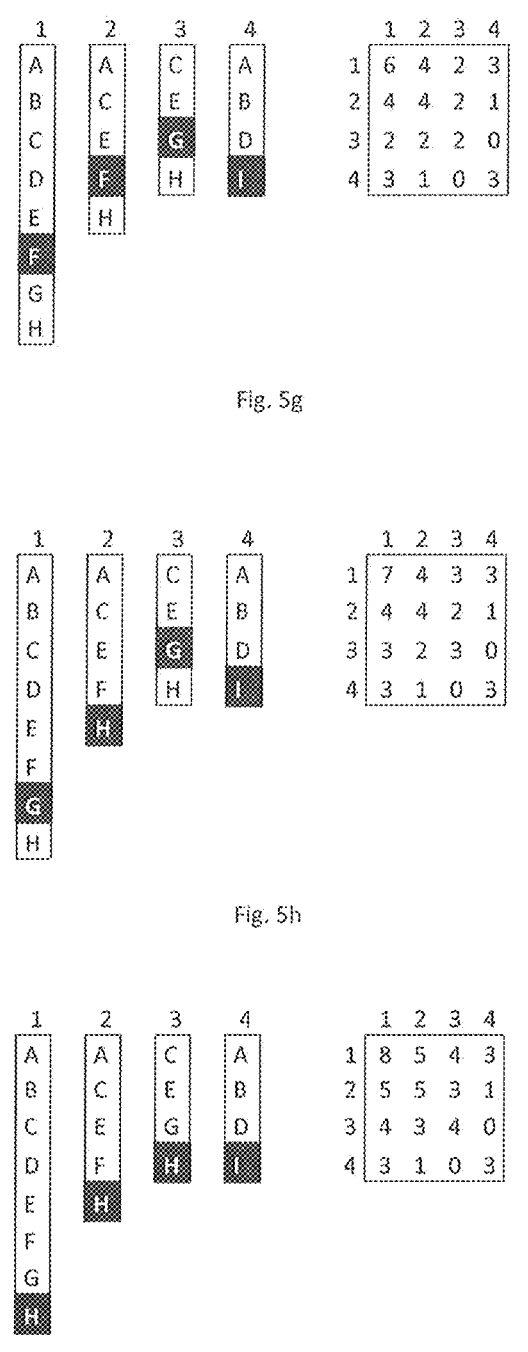
Figures 5J, 5K, 5L:
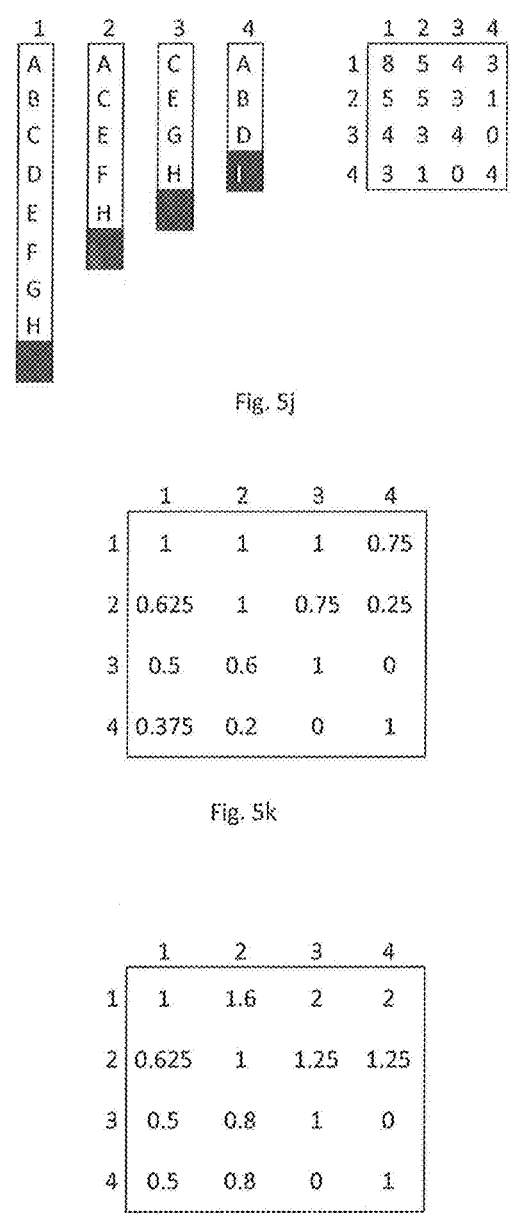

This process is repeated throughout FIGS. 5*d*-5*j*. In FIG. 5*i* the read pointers all point to the last entries the associated hash lists. The read pointers with index 1, 2 and 3 point to the lowest value "H". In step 218 now these read pointers are incremented to point to outside the respective hash lists. The index numbers of these read pointers are ignored when incrementing cells in the matrix in FIG. 5*j*. Instead of incrementing these read pointers to point outside the respective hash lists, it is also possible to refrain from incrementing these read pointers and ignoring the index numbers of these read pointers when incrementing cells in the matrix in FIG. 5*j*. In FIG. 5*j* the last read pointers (index number 4) points to the last entry "I" of the associated hash list. The resulting matrix is also shown in FIG. 5*j*. The resulting matrix can be presented to a user of the system, e.g. via the presentation unit 28.

It will be appreciated that the matrix is generated in a highly efficient manner by processing and comparing all columns in parallel. This greatly reduces the time in which the matrix is generated, which is of importance when assessing large databases. In the example of FIGS. 4 and 5 the database contains four columns of at most thirteen data entries. It will be appreciated that these extremely low numbers are just for demonstrating the underlying principle in a clear and concise manner. In more practical applications the database can contain tens of thousands or more columns and millions or billions or more separate data entries.

The resulting matrix can also be used for further analysis. The values $C_{ij}$, with i=j, on the diagonal represent the number of unique values on each hash list. For example, in FIG. 5*j* $C_{11}$ has the value "8" corresponding to the number of unique values in the first hash list. Thus also the number of unique values in the first column is eight.

The off-diagonal values, i.e. Cij with i≠j, signify the number of entries that the columns i and j have in common. Therefore, the off-diagonal cell with the highest value signifies the combination of columns i and rows j having the largest number of data entries in common. In FIG. 5*j* cells $C_{12}$ and $C_{21}$ have the value "5", indicating that columns 1 and 2 have five entries in common. In FIG. 5*j* cells $C_{34}$ and $C_{43}$ have the value "0", indicating that columns 3 and 4 have no entries in common.

The processing unit 24 may further be arranged for normalizing the values in the cells of the matrix by dividing the value of each cell $C_{ij}$ by the value of $C_{ii}$. FIG. 5*k* shows the matrix of FIG. 5*j* that has been normalized in this way.

The normalized cells $C_{ij}$ with i>j signify the percentage of overlap of values in column i found in column j. The normalized cells $C_{ij}$ with i<j signify the percentage of overlap of values in column j found in column i. For example, the value of $C_{21}$ is "1", indicating that 100% of the entries of column 2 is also included in column 1. The value of $C_{21}$ on the other hand is "0.625" indicating that 62.5% of the entries of column 1 is also included in column 2. Thus, clearly column 2 is a subset of column 1. It will be appreciated that the matrix containing the normalized values in the cells is not necessarily symmetrical relative to the diagonal.

The processing unit 24 may further be arranged for processing the cell values as shown in FIG. 5j by dividing the value of cells $C_{xy}$ by the value of cells $C_{yx}$ (division by zero may need to be excluded). FIG. 5l shows the matrix of FIG. 5j that has been processed in this way. The processed cells $C_{ij}$ signify the ratio of the amount of values present in column i relative to column j. For example, the value of $C_{32}$ is "1.25", indicating that column 2 includes 25% more data entries than column 3. The value of $C_{23}$ on the other hand is "0.8" indicating the amount of data entries in column 3 is 80% of the amount of data entries in column 2. The cell $C_{ij}$ or $C_{ji}$ having the largest normalized value and the processed value closest to one indicates the column j being the closest subset or superset of column i.

Results of such further analysis of the matrix as described above can be presented to a user of the system, e.g. via the presentation unit 28.

If a matrix has been determined for a set of N columns it is possible to add one or more columns to the set of columns and expanding the matrix to also include cell values for these added columns. Then, the retrieval unit 12 retrieves, or receives the further columns. For example a number M columns can be added to the original N columns. The hashing unit 14 and sorting unit 16 create the sorted hash lists for the additional M columns. The matrix creation unit 20 adds $N+1^{th}$ to $N+M^{th}$ columns and $N+1^{th}$ to $N+M^{th}$ rows to the matrix. Hence, an (N+M)×(N+M) matrix is obtained for the N+M columns. The processing unit 24 assigns a set of M additional indexed read pointers in addition to the original N read pointers. Each read pointer points to a single associated sorted hash list, the $N+1^{th}$ to $N+M^{th}$ read pointers pointing to the further hash lists.

In step 212 the processing unit 24 determines the index number(s) of the read pointer(s) pointing to the lowest hash value. In step 214 the value of cells $C_{ij}$ in the matrix having indices i,j, wherein i and j each correspond to any of the index numbers of the read pointers pointing to the lowest value are incremented, but only for the cells for which at least one of i and j is in the range of N+1 to N+M. The read pointer(s) pointing to the lowest hash value are incremented. This process is repeated until the last read pointers points to the last entry of the associated hash list. Thus, the original N×N matrix has been expanded to the (N+M)×(N+M) matrix.

Figure 3:
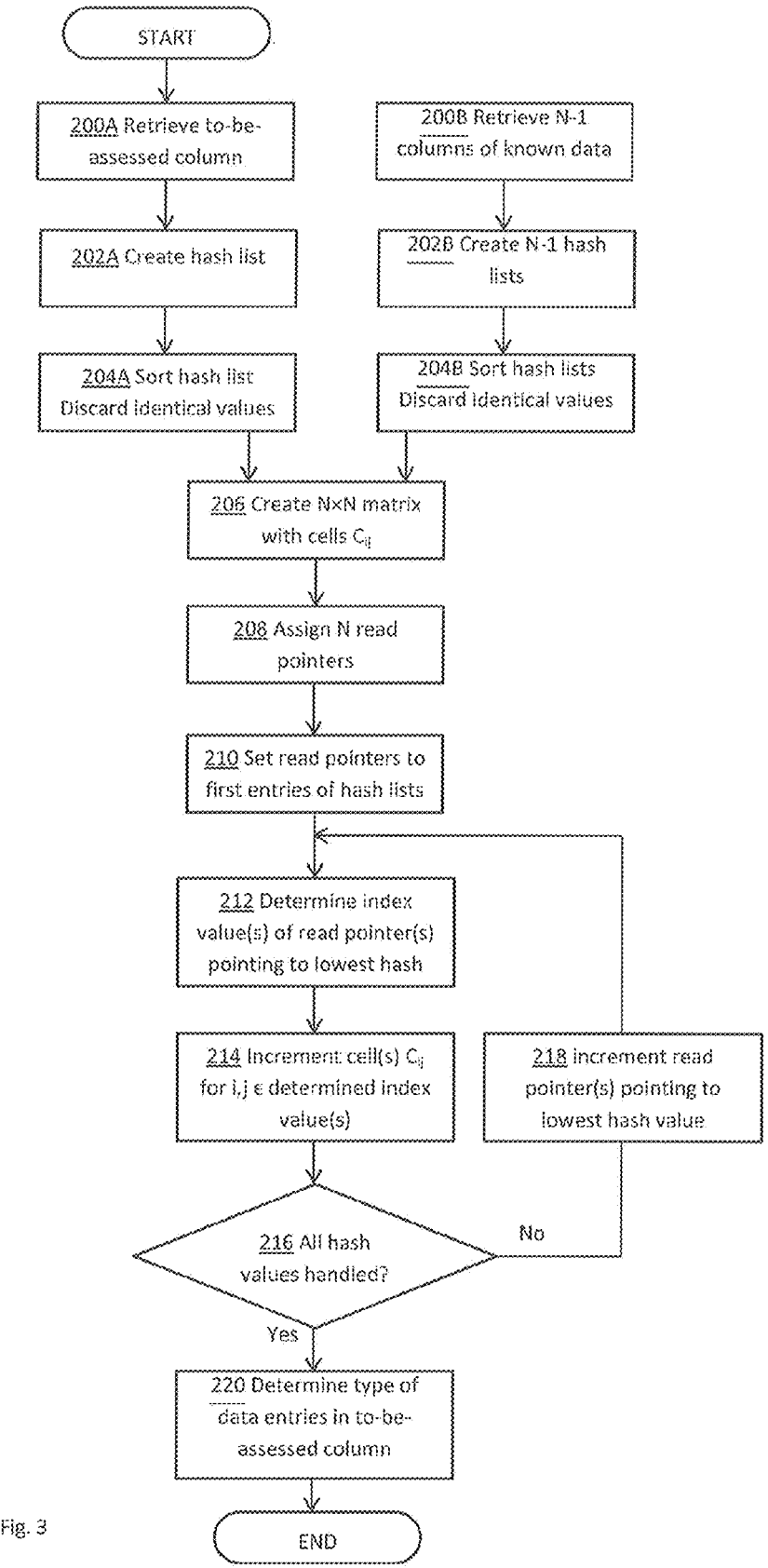
FIG. 3 is a schematic flow chart of a method in accordance with an embodiment of the invention.

The system 1 and method described thus far can also be used for determining a type of data entries in one or more to-be-assessed columns in a database. Reference is made to FIG. 3. Thereto besides retrieving, or receiving, the to-be-assessed columns in step 200A also one or more columns containing data entries of known types are retrieved, or received, in step 200B thus forming a number N of columns. These N columns are processed as described above. Thus, optionally for the to-be-assessed columns a sorted hash list is created in steps 202A and 204A, and for the columns of known types in steps 202B and 204B. The matrix is created and filled in steps 206, 208, 210, 212, 214, 216 and 218. Next, it is determined in step 220, e.g. by the processing unit 24, which cell $C_{pq}$ and/or $C_{qp}$ of the matrix indicates closest conformity between columns p and q, wherein the index p corresponds to the to-be-assessed column or columns. The type of the data entries in the to-be-assessed column is then determined to be similar to the known type of the data entries in the column corresponding to the other index q. It will be appreciated that in this example the processing module 10 retrieves, or receives, columns of data entries from the database(s) (steps 200A and 200B) and processes these columns into sorted hash lists (steps 202A, 204A, 202B and 204B). It will be appreciated that it is also possible that the processing module 10 retrieves, or receives, pre-processed sorted hash lists. For instance, the columns of data entries of known types may be retrieved, or received as sorted hash lists. Also the to-be-assessed columns may be retrieved, or received, as sorted hash lists. The hash lists of the known types may e.g. be (permanently) stored in the first memory 18.

Determining which cell $C_{pq}$ and/or $C_{qp}$ indicates closest conformity for example is done by determining which cell $C_{pq}$ and/or $C_{qp}$ has the highest value. The highest value indicates the list q having the largest number of data entries in common with column p. A large number of data entries of a known type corresponding to data entries of an unknown type may indicate a high chance, or correlation, that the unknown type is similar or identical to this known type.

Alternatively, or additionally, the values in the cells in column p of the matrix are normalized by dividing the value of each cell $C_{pj}$ by the value of $C_{pp}$. Determining which cell $C_{pq}$ indicates closest conformity then for example is done by determining which cell $C_{pq}$ has the highest normalized value. The highest normalized value indicates the list q having the largest percentage of data entries in common with column p. A large percentage of data entries from a list of a known type corresponding to data entries of an unknown type may indicate a high chance, or correlation, that the unknown type is similar or identical to this known type.

Alternatively, or additionally, the values of the cells in row p and/or column p are processed by dividing the value of cells $C_{xy}$ by the value of cells $C_{yx}$. The value of the thus processed value of $C_{ij}$ signifies the ratio of the amount of values present in column i relative to the amount of values present in column j. The cell $C_{pq}$ or $C_{qp}$ having the largest normalized value and the processed value closest to one indicates the column q being the closest subset or superset of column p.

In the foregoing, the invention has been described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

It will be appreciated that the retrieval unit, hashing unit, sorting unit, discarding unit, processing unit, matrix creation unit, and read pointer indexing unit can be embodied as dedicated electronic circuits, possibly including software code portions. The retrieval unit, hashing unit, sorting unit, discarding unit, processing unit, matrix creation unit, and read pointer indexing unit can also be embodied as software code portions executed on, and e.g. stored in, a memory of, a programmable apparatus such as a computer.

In the example the first memory 18 and the second memory 22 are part of the processing module 10. It will be appreciated that it is also possible that the first and/or second memory is included in a separate unit associated with the processing module. It is also possible that the first and second memory are both parts of one and the same memory.

In the examples, the sorted lists are processed in an ascending direction. It will be appreciated that it is also possible to process the sorted lists in a descending direction. Then, the processing unit starts by determining the index number(s) of the read pointer(s) pointing to the highest value in the first memory. The processing unit then increments the value of cells $C_{ij}$ in the matrix in the second memory having indices i,j, wherein i and j each correspond to any of the index numbers of the pointer(s) pointing to the highest value. The read pointer incrementing unit then increments the read pointer(s) pointing to the highest value to point to the next, lower, value(s).

In the examples, the values of the cells of the matrix are incremented by one. This may be beneficial so that integer values can be used. It will be appreciated that the values can be incremented by other values as well.

In the example of FIGS. 5a-5j all values of the matrix are incremented in step 214. It will be appreciated that the resulting matrix as shown in FIG. 5j is symmetrical with respect to the diagonal, that is, $C_{xy}=C_{yx}$. Therefore, it is also possible that in step 214 only half of the matrix is updated, for instance only the cells $C_{ij}$ for which i≥j or the cells $C_{ij}$ for which i≤j. Then still the normalized matrix as shown in FIG. 5k can de obtained, due to the known symmetry of the matrix as shown in FIG. 5j.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means, e.g. via the internet or cloud.

When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A non-transitory computer readable medium configured to store software instructions for causing an electronic processor to determine a measure of overlap between data entries in a number N of database columns in at least one databases, where N is a number greater than one, the software including instructions to perform operations, comprising:

a) creating for each of the N database columns a hash list comprising individual hash values where each hash value is representative of the corresponding data entry in the respective database column, determining a desired level of accuracy, and creating the hash values having a length determined on the basis of the desired level of accuracy, the values in each of the hash lists being sorted according to a predetermined order and repetitious values in each of the hash lists being discarded and the hash lists stored in a first memory;

b) creating an N×N matrix having a number N of matrix columns and a number N of matrix rows both equal to the number N of database columns, the matrix having cells $C_{ij}$, wherein i represents the matrix column number and j represents the matrix row number for each of the cells in the matrix, the matrix being used to determine which of said cells indicates closest conformity between said database columns;

c) assigning to each of the hash lists a read pointer so that each of the read pointers designates the single associated sorted hash list;

d) setting each of the read pointers to a first of the hash values of the associated sorted hash list;

e) determining which of the N database columns correspond to the respective hash lists in which the read pointers designate the hash values that are the lowest across all of the hash lists when the hash lists are sorted in ascending order, and the highest when the hash lists are sorted in descending order;

f) incrementing the value of the cells $C_{ij}$ in the matrix having indices i,j, wherein at least one of i and j corresponds to each unique combination of index numbers determined in one of the N database columns determined in step e);

g) indexing each of the read pointers determined in step e) to designate the next consecutive hash value in the respective hash list and repeating steps e) through f) until the read pointers have all been indexed to designate the last entry in each of the associated sorted hash lists, wherein:

the electronic processor compares each database column in parallel, performs the above steps b)-g) without having direct access to any individual data entry, after step g), normalizing the values in the cells of the matrix by dividing the value of each cell $C_{ij}$ by the value of $C_{ij}$, and these steps permit the electronic processor to determine a measure of overlap between data entries in any pair of database columns by evaluating a smaller portion of data entries than an actual number of data entries.

2. The non-transitory medium of claim 1 wherein step e) further includes incrementing the value of the cells $C_{ij}$ in the matrix having indices i,j, wherein i,j corresponds to each unique combination of the indexes of the read pointers, including the cases i=j.

3. The non-transitory medium of claim 1 wherein step f) includes incrementing the value of all cells $C_{ij}$ in the matrix having indices i,j, wherein i and j each corresponding to any of the indexes of the read pointers.

4. The non-transitory medium of claim 1, wherein all hash values within a hash list have the same length.

5. The non-transitory medium of claim 1, wherein all hash values in all hash lists have the same length.

6. The non-transitory medium of claim 1, further including after step g), determining the cell $C_{ij}$, with i unequal to j, indicating the closest conformity and having the highest value.

7. The non-transitory medium of claim 1, further including after step g) determining the cell(s) $C_{ij}$ having a value that is higher than a threshold value.

8. The non-transitory medium of claim 1, further including determining the cell(s) $C_{ij}$ having a normalized value that is higher than a threshold value.

9. The non-transitory medium of claim 1, wherein the number N of columns is more than 1000, more preferably more than 10000, even more preferably more than 100000.

10. The non-transitory medium of claim 1, further including performing the step of including in the number N of columns at least one column containing data entries of a known type.

11. The non-transitory medium of claim 1, wherein step f) includes:
when the read pointer was not already pointing to the last entry in the hash list: incrementing the read pointer(s) pointing to the hash value determined in step e) to point to the next entry in the respective hash list, and
when the read pointer was already pointing to the last entry in the hash list: not incrementing the read pointer(s) pointing to the hash value determined in step e), or incrementing the read pointer(s) pointing to the hash value determined in step e) to point to outside the respective hash list, and ignoring the indexes of that read pointer(s) for subsequent steps f) and g).

12. The non-transitory medium of claim 1, further including after step g):
h) receiving a further column and creating a further sorted hash list comprising for each data entry in the further column a hash value representative of said data entry;
i) adding an $N+1^{th}$ column and an $N+1^{th}$ row to the matrix;
j) assigning a set of N+1 indexed read pointers, each read pointer pointing to a single associated sorted hash list, the $N+1^{th}$ read pointer pointing to the further hash list;
k) setting each read pointer to the first entry of the associated hash list;
l) determining the index(es) of the read pointer(s) pointing to the lowest hash value when processing the lists in ascending order, or determining the index(es) of the read pointer(s) pointing to the highest hash value when processing the lists in descending order;
m) incrementing the value of cells $C_{ij}$ in the matrix having indices i,j, wherein i and j each corresponding to any of the index(es) determined in step l) and wherein at least one of i and j is equal to N+1;
n) incrementing the read pointer(s) having the index(es) determined in step m) and repeating steps l) and m); and
o) repeating step n) until the last read pointer(s) points to the last entry of the associated hash list.

13. The non-transitory medium of claim 1, further including after step g):
h) receiving a further number M of columns and creating M further sorted hash lists comprising for each data entry in the further column a hash value representative of said data entry;
i) adding $N+1^{th}$ to $N+M^{th}$ columns and $N+1^{th}$ to $N+M^{th}$ rows to the matrix;
j) assigning a set of N+M indexed read pointers, each read pointer pointing to a single associated sorted hash list, the $N+1^{th}$ to $N+M^{th}$ read pointers pointing to the further hash lists;
k) setting each read pointer to the first entry of the associated hash list;
l) determining the index(es) of the read pointer(s) pointing to the lowest hash value when processing the lists in ascending order, or determining the index(es) of the read pointer(s) pointing to the highest hash value when processing the lists in descending order;
m) incrementing the value of cells $C_{ij}$ in the matrix having indices i,j, wherein i and j each correspond to any of the index(es) determined in step l) and wherein at least one of i and j is in the range of N+1 to N+M;
n) incrementing the read pointer(s) having the index(es) determined in step m) and repeating steps l) and m); and
o) repeating step n) until the last read pointer(s) points to the last entry of the associated hash list.

14. The non-transitory medium of claim 1, wherein a type of data entries in at least one of the database columns is one of first name, last name, social security number, phone number, email address, IP-address, street address, postal code, city, country, bank account number, credit card number.

15. A non-transitory computer readable medium configured to store software instructions for causing an electronic processor to determine a measure of overlap between data entries in a number N of database columns in one or more databases, where N is a number greater than one, the software including instructions to perform operations comprising:
a) retrieving for each of the N database columns a hash list comprising individual hash values where each hash value is representative of the corresponding data entry in the respective database column, the values in each of the hash lists being sorted according to a predetermined order and repetitious values in each of the hash lists being discarded, and the hash lists stored in a first memory, determining a desired level of accuracy, and creating the hash values having a length determined on the basis of the desired level of accuracy;
b) creating an N×N matrix having a number N of matrix columns and a number N of matrix rows both equal to the number N of database columns, the matrix having cells $C_{ij}$, wherein i represents the matrix column number and j represents the matrix row number for each of the cells in the matrix, the matrix being used to determine which of said cells indicates closest conformity between said database columns;
c) assigning to each of the hash lists a read pointer so that each of the read pointers designates the single associated sorted hash list;
d) setting each of the read pointers to a first of the hash values of the associated sorted hash list;
e) determining which of the N database columns correspond to the respective hash lists in which the read pointers designate the hash values that are the lowest across all of the hash lists when the hash lists are sorted in ascending order, and the highest when the hash lists are sorted in descending order;

f) incrementing the value of the cells $C_{ij}$ in the matrix having indices i,j, wherein at least one of i and j corresponds to each unique combination of index numbers determined in one of the N database columns determined in step e);

g) indexing each of the read pointers determined in step e) to designate the next consecutive hash value in the respective hash list and repeating e) through f) until the read pointers have all been indexed to designate the last entry in each of the associated sorted hash lists, wherein:

the electronic processor compares each database column in parallel, performs the above steps b)-g) without having direct access to any individual data entry, after step g), normalizing the values in the cells of the matrix by dividing the value of each cell $C_{ij}$ by the value of $C_{ij}$, and these steps permit the electronic processor to determine a measure of overlap between data entries in any pair of database columns by evaluating a smaller portion of data entries than an actual number of data entries.

16. A data analysis system having a non-transitory computer readable medium configured to store software instructions for causing an electronic processor to determine a measure of overlap between database columns of data entries, the data analysis system, comprising:

at least one database storing a number N of database columns of data entries, where N is a number greater than one;

a first memory;

a second memory; and a processing module, including a hashing unit, at least one of a sorting unit and a discarding unit, a matrix creation unit, and a read pointer incrementing unit, arranged for:

a) retrieving for each of the N database columns a hash list comprising individual hash values where each hash value is representative of the corresponding data entry in the respective database column, the values in each of the hash lists being sorted according to a predetermined order and repetitious values in each of the hash lists being discarded, and storing the hash lists in the first memory, determining a desired level of accuracy, and creating the hash values having a length determined on the basis of the desired level of accuracy;

b) creating an N×N matrix having a number N of matrix columns and a number N of matrix rows both equal to the number N of database columns, the matrix having cells Cij, wherein i represents the matrix column number and j represents the matrix row number for each of the cells in the matrix, and storing the matrix in the second memory, the matrix being used to determine which of said cells indicates closest conformity between said database columns;

c) assigning to each of the hash lists a read pointer so that each of the read pointers designates the single associated sorted hash list;

d) setting each of the read pointers to a first of the hash values of the associated sorted hash list;

e) determining which of the N database columns correspond to the respective hash lists in which the read pointers designate the hash values that are the lowest across all of the hash lists when the hash lists are sorted in ascending order, and the highest when the hash lists are sorted in descending order;

f) incrementing the value of the cells Cij in the matrix in the second memory having indices i,j, wherein at least one of i and j corresponds to each unique combination of index numbers determined in one of the N database columns determined in step e);

g) indexing each of the read pointers determined in step e) to designate the next consecutive value in the respective hash list and repeating steps e) through f) until the read pointers have all been indexed to designate the last entry in each of the associated sorted hash lists, wherein:

the electronic processor compares each database column in parallel, performs the above steps b)-g) without having direct access to any individual data entry, after step g), normalizing the values in the cells of the matrix by dividing the value of each cell Cij by the value of Cii, and these steps permit the electronic processor to determine a measure of overlap between data entries in any pair of database columns by evaluating a smaller portion of data entries than an actual number of data entries.

17. The data analysis system of claim 16, wherein the processing module is further arranged for creating for each database column a hash list comprising for each data entry in the database column a hash value representative of said data entry; and sorting the hash lists according to a predetermined order.

18. A non-transitory computer readable medium configured to store computer implementable software instructions which when implemented by a programmable computer causes the computer to determine a measure of overlap between data entries in a number N of database columns in one or more databases, where N is a number greater than one, the software including instructions to perform operations comprising:

a) retrieving for each of the N database columns a hash list comprising individual hash values where each hash value is representative of the corresponding data entry in the respective database column, the values in each of the lists being sorted according to a predetermined order and repetitious values in each of the hash lists being discarded, and the hash lists stored in a first memory, determining a desired level of accuracy, and creating the hash values having a length determined on the basis of the desired level of accuracy;

b) creating an N×N matrix having a number N of matrix columns and a number N of matrix rows both equal to the number N of database columns, the matrix having cells $C_{ij}$, wherein i represents the matrix column number and j represents the matrix row number for each of the cells in the matrix, the matrix being used to determine which of said cells indicates closest conformity between said database columns;

c) assigning to each of the hash lists a read pointer so that each of the read pointers designates the single associated sorted hash list;

d) setting each of the read pointers to a first of the hash values of the associated sorted hash list;

e) determining which of the N database columns correspond to the respective hash lists in which the read pointers designate the hash values that are the lowest across all of the hash lists when the hash lists are sorted in ascending order, and the highest when the hash lists are sorted in descending order;

f) incrementing the value of the cells $C_{ij}$ in the matrix having indices i,j, wherein at least one of i and j corresponds to each unique combination of index numbers determined in one of the N database columns determined in step e);
g) indexing each of the read pointers determined in step e) to designate the next consecutive value in the respective hash list and repeating steps e) through f) until the read pointers have all been indexed to designate the last entry in each of the associated sorted hash lists, wherein:

the programmable computer compares each database column in parallel, performs the above steps b)-g) without having direct access to any individual data entry, after step g), normalizing the values in the cells of the matrix by dividing the value of each cell $C_{ij}$ by the value of $C_{ij}$, and these steps permit the programmable computer to determine a measure of overlap between data entries in any pair of database columns by evaluating a smaller portion of data entries than an actual number of data entries.

* * * * *